(No Model.)

W. H. C. GOODE.
EARTH SCRAPER.

No. 318,721. Patented May 26, 1885.

WITNESSES:
H. B. Brown
Edw. W. Byrn

INVENTOR:
W. H. C. Goode
BY Munn & Co.
ATTORNEYS.

UNITED STATES PATENT OFFICE.

WILLIAM H. C. GOODE, OF SIDNEY, OHIO.

EARTH-SCRAPER.

SPECIFICATION forming part of Letters Patent No. 318,721, dated May 26, 1885.

Application filed December 3, 1884. (No model.)

*To all whom it may concern:*

Be it known that I, WILLIAM H. C. GOODE, a citizen of the United States, residing at Sidney, in the county of Shelby and State of Ohio, have invented certain new and useful Improvements in Earth-Scrapers, of which the following is a description.

My invention relates to the class of earth-scrapers known as "wheeled scrapers."

Figure 1:
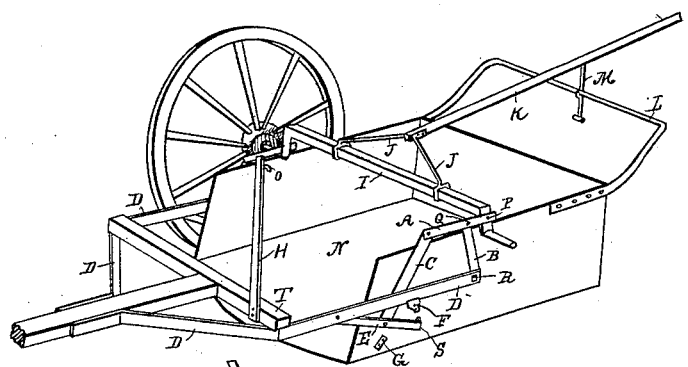
Figure 2:
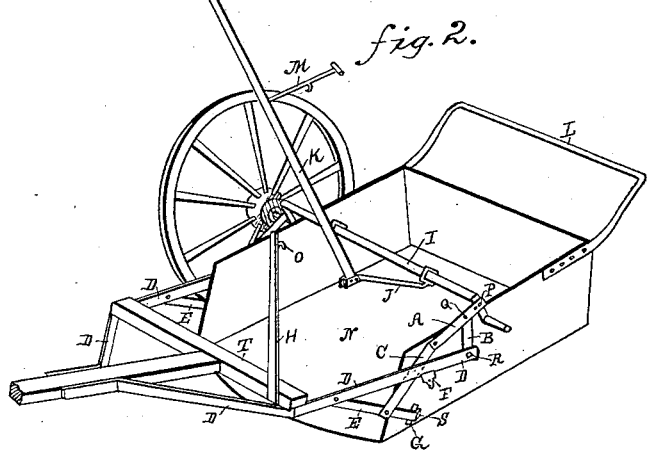
Figure 3:
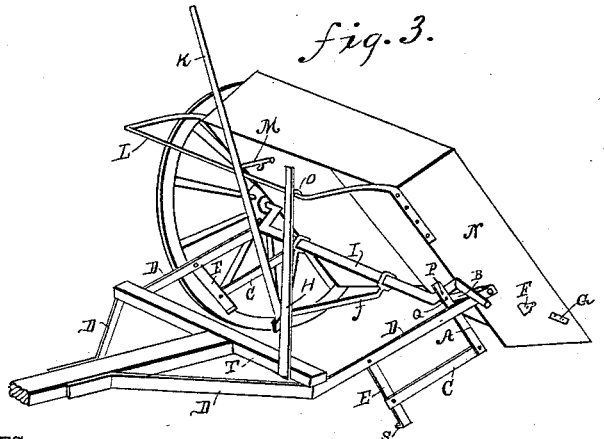

Figure 1 shows a perspective view of a scraper when loaded with left wheel removed. Fig. 2 is a similar view with the scraper ready to fill. Fig. 3 is a perspective of scraper dumped and in position for transportation with left wheel removed.

In the drawings, N is the scraper, whose sides are pivoted at R to the draft-bars D. About the point R a bar, B, is also pivoted, and which at its upper end is pivoted at Q to bar A, which latter is rigidly fastened at P to the square or right-angular shoulder of the crank-axle. The forward end of bar A is pivoted to bar C, which, at its lower or front end, is pivoted to bar E near its middle, which latter is pivoted at its front end to draft-bar D, and at its rear end is provided with an inturned hook, S, that is adapted to engage with a stop-lug, G, on the side of the scraper.

F is a stop-lug on the side of the scraper, which rests beneath bar D, and keeps the scraper steady about its pivot R.

H is a vertical standard, rising from the cross-bar T of the tongue and having a catch, o, that is adapted to engage a rear bail, L, when the scraper is dumped, as shown in Fig. 3.

K is a bar, rigidly fastened to the crank-axle by clamps J J, by which bar the crank-axle is rocked to operate the scraper. This bar K is provided with a spring-catch, M, which, when the scraper is in position for transportation, as in Fig. 1, engages with rear bail, L, and holds the crank-axle steady.

Both sides of the scraper being equipped alike, its operation is as follows: The scraper being in position shown in Fig. 1, and empty, it is filled as follows: Bar K is disengaged from bail L and is thrown forward, as in Fig. 2. This tilts crank-axle, and by dropping the pivotal point R of the scraper brings its point to the ground in position to be filled. The same motion also causes bars A and C to extend like toggle-arms, and throws the hook S against stop-lug G, which keeps the scraper from turning on its pivot and resists the strain of filling. When filled, bar K is brought back to position shown in Fig. 1, and the scraper is thus transported. Now, to dump, the scraper is dropped, as in Fig. 2, and bail L is lifted until the point of scraper enters the earth and hook S rises above stop-lug G, and then the strain of the team turns the scraper about its pivot R until its bail L is caught under catch o of standard H, as shown in Fig. 3.

Having thus described my invention, what I claim as new is—

1. The combination, with the scraper having stop-lugs G and F on its sides, of the crank-axle I, rigidly-attached bars A, draft-bars D, pivoted at R to the sides of the scraper and resting on lugs F, the bars B, pivoted at R, and also to bars A at Q, the bars C, pivoted to A as toggle-arms, and bars E, pivoted to bars D and C, and having hooked ends S, adapted to engage with stop-lugs G, substantially as shown and described.

2. The combination, with the scraper having stop-lugs G and F on its sides and a rear bail, L, of the crank-axle I, rigidly-attached bar K, with spring-catch M, the rigidly-attached bars A, draft-bars D, pivoted at R to the sides of the scraper, the bars B, pivoted at R, and also to bars A at Q, the bars C, pivoted to A as toggle-arms, and bars E, pivoted to the bars D and C, and having hooked ends S, adapted to engage with the stop-lugs G, substantially as shown and described.

3. The combination, with the scraper having stop-lugs G and F on its sides and a rear bail, L, of the crank-axle I, rigidly-attached bar K, with spring-catch M, the rigidly-attached bars A, draft-bars D, pivoted at R to the sides of the scraper, the bars B, pivoted at R, and also to bars A at Q, the bars C, pivoted to A as toggle-arms, bars E, pivoted to draft-bars D and bars C, and having hooked ends S, adapted to engage the stop-lugs G, and the standard H, with catch o, substantially as shown and described.

WILLIAM H. C. GOODE.

Witnesses:
W. E. KILBORN,
S. W. WILSON.